United States Patent
Thomas et al.

(10) Patent No.: US 10,567,457 B1
(45) Date of Patent: Feb. 18, 2020

(54) DYNAMIC ROTATION OF STREAMING PROTOCOLS

(71) Applicant: Amazon Technologies, Inc., Reno, NV (US)

(72) Inventors: Nathan Bartholomew Thomas, Seattle, WA (US); Eugene Michael Farrell, Sammamish, WA (US); Erik Jonathon Tellvik, Renton, WA (US); Deepak Suryanarayanan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 423 days.

(21) Appl. No.: 14/500,845

(22) Filed: Sep. 29, 2014

(51) Int. Cl.
*H04L 29/06* (2006.01)
*H04L 29/08* (2006.01)
*G06F 9/451* (2018.01)

(52) U.S. Cl.
CPC .............. *H04L 65/60* (2013.01); *H04L 67/02* (2013.01); *G06F 9/452* (2018.02); *H04L 67/42* (2013.01)

(58) Field of Classification Search
CPC ... H04L 69/18; H04L 65/608; H04L 65/4084; H04L 69/08; H04L 29/06027; H04L 67/42; H04L 67/101; H04L 67/1012; H04L 45/52; H04W 36/14; H04W 80/045; H04N 21/23106; H04N 21/43615; H04N 21/4622; H04N 21/4668; H04N 21/47202; G06F 9/452
See application file for complete search history.

(56) References Cited

U.S. PATENT DOCUMENTS

| | | | | |
|---|---|---|---|---|
| 8,504,694 | B2* | 8/2013 | Mahajan | G06F 15/16 709/217 |
| 8,855,189 | B1* | 10/2014 | Krause | H04N 21/234309 370/307 |
| 8,880,715 | B2* | 11/2014 | Bailey | H04L 69/16 709/230 |
| 8,918,533 | B2* | 12/2014 | Chen | H04N 21/23439 709/231 |
| 9,414,231 | B2* | 8/2016 | Watts | H04W 12/08 |
| 9,473,546 | B2* | 10/2016 | Shah | H04L 65/403 |
| 2009/0215504 | A1* | 8/2009 | Lando | H04L 29/06027 455/574 |

(Continued)

OTHER PUBLICATIONS

Different types of streaming protocols to same client—Google Search, Jan. 19, 2017.*

(Continued)

*Primary Examiner* — Philip J Chea
*Assistant Examiner* — Ruth Solomon
(74) *Attorney, Agent, or Firm* — Davis Wright Tremaine LLP (57) ABSTRACT

A method and apparatus for dynamic rotation of streaming protocols are disclosed. In the method and apparatus, a first portion of content is streamed to a client device in accordance with a first content delivery protocol. Further, information indicating client device attributes, network conditions or usage conditions is received. A plurality of content delivery protocols including the first content delivery protocol are evaluated based at least in part on the received information to identify a content delivery protocol for streaming the a second portion of the content.

20 Claims, 8 Drawing Sheets

(56) References Cited

U.S. PATENT DOCUMENTS

| | | | | |
|---|---|---|---|---|
| 2010/0106766 | A1* | 4/2010 | Bailey | H04L 69/16 709/203 |
| 2011/0219122 | A1* | 9/2011 | Mahajan | G06F 15/16 709/227 |
| 2012/0016965 | A1* | 1/2012 | Chen | H04N 21/23439 709/219 |
| 2012/0079126 | A1* | 3/2012 | Evans | H04L 67/1095 709/230 |
| 2012/0131219 | A1* | 5/2012 | Brannon, Jr. | H04N 21/23608 709/231 |
| 2013/0283171 | A1* | 10/2013 | Schick | G06F 3/0481 715/733 |
| 2014/0068789 | A1* | 3/2014 | Watts | H04W 12/08 726/29 |
| 2014/0095726 | A1* | 4/2014 | Fok | H04L 65/4015 709/228 |
| 2014/0317183 | A1* | 10/2014 | Shah | H04L 65/403 709/204 |
| 2014/0331054 | A1* | 11/2014 | Hanumantharayappa | H04L 63/0428 713/176 |
| 2015/0295982 | A1* | 10/2015 | Kafle | H04L 65/1083 709/219 |

OTHER PUBLICATIONS

Komatsu, Ryohei, and Shin-Ichi Kuribayashi. "Impact of Network Quality Deterioration on User's Perceived Operability in Remote Desktop Environments." In 2014 17th International Conference on Network-Based Information Systems, pp. 540-544. IEEE, 2014. (Year: 2014).*

Calyam, Prasad, Sudharsan Rajagopalan, Sripriya Seetharam, Arunprasath Selvadhurai, Khaled Salah, and Rajiv Ramnath. "VDC-Analyst: Design and verification of virtual desktop cloud resource allocations." Computer Networks 68 (2014): 110-122. (Year: 2014).*

Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.

Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.

Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.

* cited by examiner

DYNAMIC ROTATION OF STREAMING PROTOCOLS

BACKGROUND

The advent of remote computing applications that are provided by remote service providers has resulted in the migration of computational functionality from away from on-premises equipment and computing resources. For example, many organizations utilize computing functionality provided by a remote service provider to give their employees access to a remote desktop environment thereby obviating the need for locally executed operating system and applications on an employee's device. Further, document collaboration applications enable users to collaborate, comment on or edit documents stored and managed by a remote service provider. In all remote computing applications, however, content, such as audiovisual media, is required to be provided to various devices that are connected to the remote service provider using different networks having different network conditions. The devices may also have different attributes.

Accordingly, it is challenging optimally deliver content to client devices having different device attributes and experiencing changing network conditions. Further, it is challenging to dynamically change the content delivery protocol used to provide content to a client device based at least in part on changing network conditions, usage conditions or device attributes.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include dynamically rotating content delivery protocols used to stream content (for example, that is part of a streaming session) to a client device. A client device may receive content, such as audiovisual content, from a streaming server. The streaming session may be a remote desktop session (also called a virtual desktop session) of a virtual desktop infrastructure (VDI) by which a user of the client device interacts with a remotely executed computer system desktop environment, among others. The client device, which may be a laptop computer or tablet computer, among others, may receive content as part of the session for rendering on the user device. The content may be delivered over a network, such as the Internet, utilizing an underlying Internet protocol, such as Transmission Control Protocol/Internet Protocol (TCP/IP) or User Datagram Protocol (UDP), among others. Further, the content may be encoded or compressed in accordance with a lossy or lossless encoding scheme, such as any Moving Picture Experts Group (MPEG) protocol, among others.

In addition to the utilized Internet protocol or encoding or compression scheme, the content may be delivered in accordance with a content delivery protocol. The content delivery protocol may facilitate delivering the encoded content over an Internet infrastructure in a continued or uninterrupted manner. For example, a remote desktop session may be highly user interactive and providing the remote desktop session on a user device may require utilization of a content delivery protocol, such as the remote desktop protocol (RDP), that delivers a desired user experience over the Internet.

Various content delivery protocols are available for use to provide content to a client device. Furthermore, the content delivery protocols have a set of features that render them optimal for particular network conditions or device attributes. For example, some content delivery protocols are bandwidth efficient for delivering content that is rendered on certain screen sizes. However, other content delivery protocols may not be bandwidth-intensive in terms of their data usage and may be optimally used under low network bitrate conditions. Accordingly, the user experience may be improved if the type of content delivery protocol used to stream content is dynamically changed based at least in part on network conditions or devices attributes, among others.

A service provider may monitor the conditions of the network over which content is delivered to a client device, whereby the conditions may include a bandwidth of data transmission over the network, such as a bitrate. The conditions may also include a quality-of-service (QoS) associated with the network as measured, for example, by a bit error rate or a packet error rate. Further, the service provider may receive attributes of the client device receiving the content, whereby the attributes may include any hardware or software property of the client device. The attributes may include a screen size, screen resolution, audio output device type, processor type or clock speed, video card type or capability or camera type, among others. Furthermore, the service provider may receive usage conditions associated with the stream content, whereby the usage conditions may indicate the manner in which the content is rendered on the client device. For example, the usage conditions may indicate whether a user of the client device navigated away from the content rendered on the client device or minimized an application used render the content.

The service provider may dynamically rotate the content delivery protocol used to stream the content to the client device based at least in part on the device attributes, network conditions or usage conditions. The service provider may select a content delivery protocol for use in providing content based at least in part the device attributes, network conditions or usage conditions. Further content may be streamed in accordance with the selected content delivery protocol. Whereas a first portion of the content may be streamed to the client device in accordance with a first content delivery protocol, a second portion of the content may be streamed in accordance with the first content delivery protocol or a second content delivery protocol different from the first content delivery protocol. Monitoring the received indicia and changing the content delivery protocol used based at least in part on the indicia may be performed throughout the streamed session.

Figure 1:
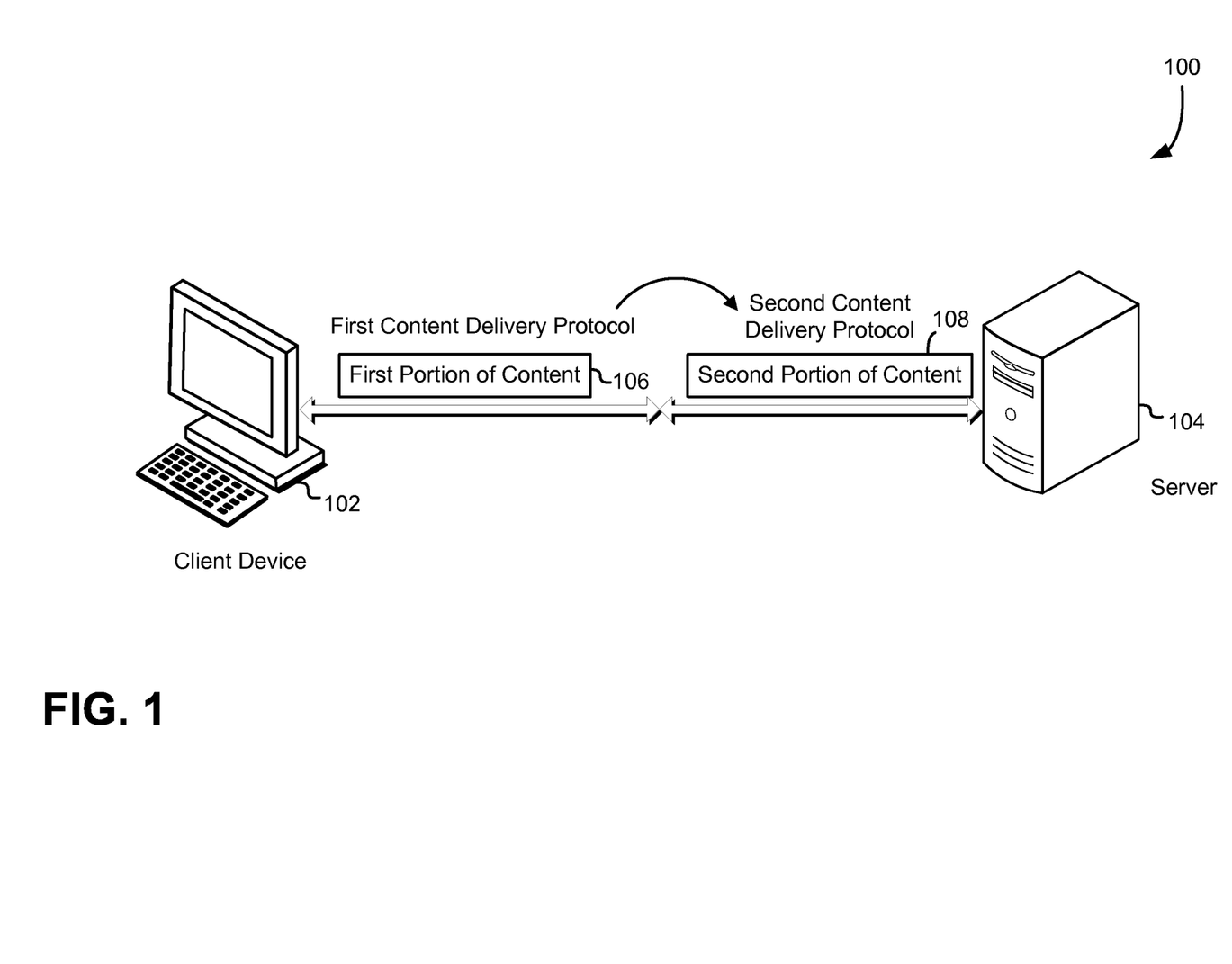
FIG. 1 shows an example of an environment for streaming content to a client device in accordance with at least one embodiment.

FIG. 1 shows an example of an environment for streaming content to a client device in accordance with at least one embodiment. In the environment 100, a client device 102, which may be any type of device such as a consumer electronics device, receives content from a server 104 and sends content to the server 104. The content may be received or transmitted over a network (not shown), which may be the Internet. The content includes a first portion 106 and a second portion 108. The first portion of the content 106 may be streamed to the client device 102 in accordance with a first content delivery protocol. Following evaluation of indicia, which may include network conditions, usage conditions or attributes of the client device 102, the content delivery protocol used to provide the content to the client device 102 may be switch to a second content delivery protocol. Following the switch to the second content delivery protocol, the second portion of the content 108 may be provided to the client device 102 in accordance with the second content delivery protocol. In various embodiments, evaluation of the indicia may result in continuing streaming using the first content delivery protocol, whereby the second portion 108 of the content may be delivered using the first content delivery protocol. Furthermore, content received by the server 104 from the client device 102 may be in accordance with the first content delivery protocol.

Figure 2:
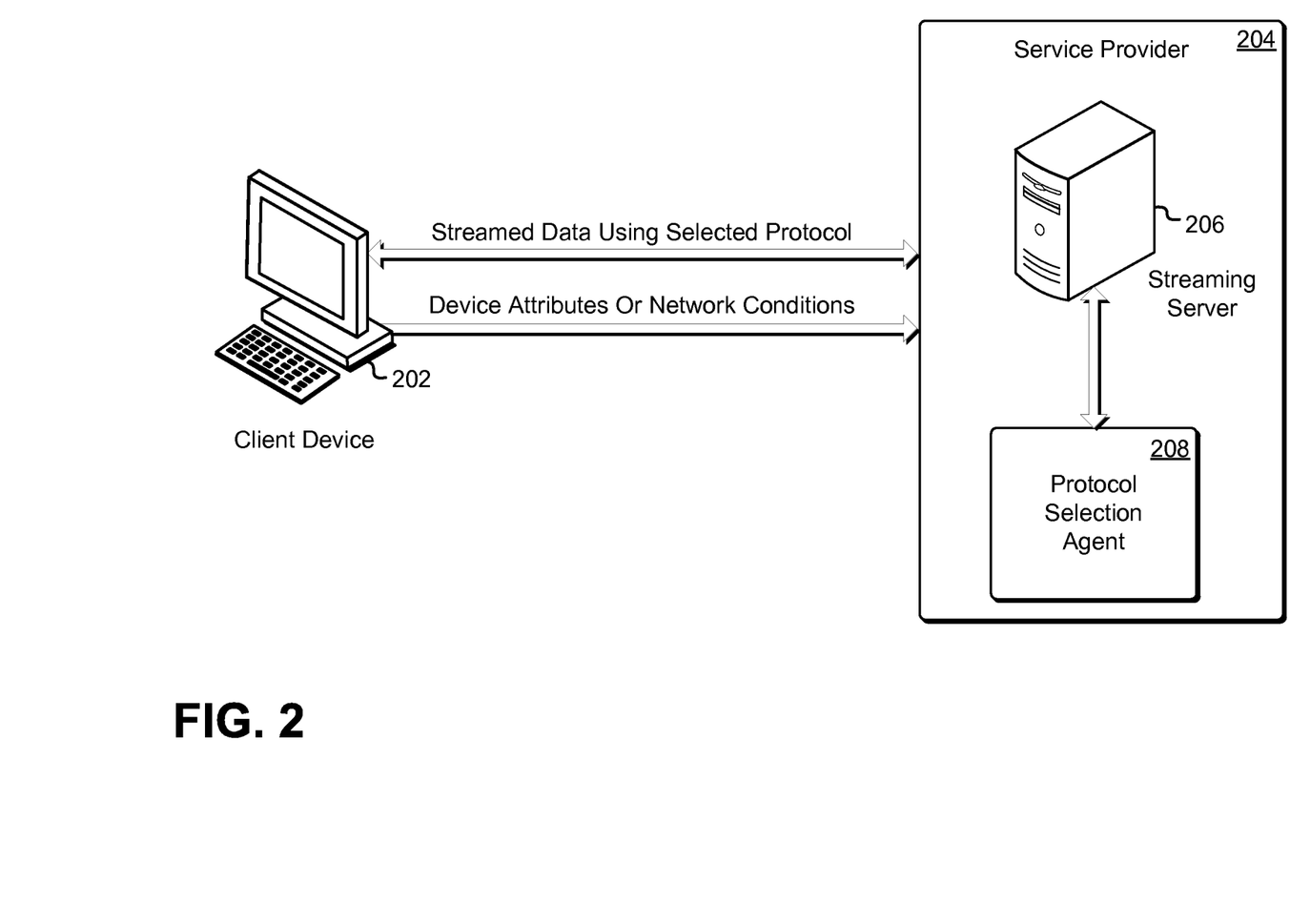
FIG. 2 shows an example of a client device communicating with a service provider in accordance with at least one embodiment.

FIG. 2 shows an example of a client device 202 communicating with a service provider 204 in accordance with at least one embodiment. The client device 202 may be any type of device that is configured to communicate with the service provider 204, for example, by transmitting data to the service provider 204 or receiving data from the service provider 204. Examples of the client device 202 include a consumer electronics device, such as a laptop or desktop computer, tablet, smartphone, Internet-enabled television (also known as a smart television), set-top box or streaming player, among others. The service provider 204 may include one or more computing resources that are configured to provide a service to the client device 202, whereby the service may include multimedia streaming, video or audio conferencing or remote desktop computing, among many others. The service provider 204 is shown to include a streaming server 206 and a protocol selection agent 208. The protocol selection agent 208 may be configured to select a protocol for use in providing content to the client device 202, whereby the content may be any type of media. The streaming server 206, on the other hand, may be configured to communicate with the client device 202 and cause the content to be sent to the client device 202 using the selected protocol. The protocol (which is also referred to a communication or networking protocol) may be any set of rules or system for exchanging or delivering data over a network, such as the Internet. Examples of protocols used for providing content to the client device 202 include the remote desktop protocol (RDP) used over a transmission control protocol (TCP) or user datagram protocol (UDP), and PC-over-IP (PCoIP), among many others.

Still referring to FIG. 2, the client device 202 may be any type of device that is configured to communicate with the service provider 204 or associated streaming server 206 or protocol selection agent 208. The user device 202 may be configured with a networking device, such as a modem or any other type of network card or radio. The networking device may enable the client device 202 to communicate over a wireless communications network, for example, using an Institute for Electrical and Electronics Engineers (IEEE) 802.11, 802.16, or 802.21 wireless local area network (WLAN), or a wired local area network (LAN). In addition, the client device 202 may communicate over a long range cellular communications network, such as a fourth generation (4G) communications network, evolved high-speed packet access (HSPA+) communications network or long term evolution (LTE™) communications network. The bandwidth, speed or latency of communication with the client device 202 may be dependent upon network conditions as well as the type of network used. For example, higher bandwidth and lower latency may be achieved when communicating over a wired local area network than when communicating using a cellular communications network.

The client device 202 may also be equipped with a processor, such as a central processing unit (CPU) or a graphics processing unit (GPU), that provides computing functionality to a user. The processor may be a single-core or multi-core processor, whereby examples of a processor include a CPU utilizing a complex instruction set computing (CISC) architecture, such as the x86 CPU. Furthermore, the CPU may have a reduced instruction set computing (RISC) architecture, such as the advanced RISC machine (ARM) CPU. The attributes of the computing functionality of the client device 202 may influence the type of content that is capable of being rendered on the client device 202. For example, the capability to render high frame rate video on the client device 202 may require that the client device 202 be equipped with a CPU having a minimum processor clock speed or number of processor cores. If the client device 202 does not meet the minimum requirements, received video may be displayed at a lower resolution or lower frame rate thereby obviating the need to provide high resolution or high frame rate video to the client device 202. Similarly, the capability to render high-resolution three-dimensional (3D) graphics (such as those used in computer gaming application) may require that the client device 202 be configured with a GPU having a minimum number of thread execution pipelines, a GPU that is capable of performing a minimum number of shading or vertex processing operations, or a GPU that is configured with a texture cache having a certain size. If the client device's 202 GPU does not meet the requirements, the client device 202 may only be capable of rendering 3D graphics having a certain quality or resolution.

The client device 202 may equipped with memory resources and storage resources. The memory resources may include volatile and non-volatile memory. For example, the non-volatile memory may include flash memory, read-only memory (ROM) as well as electrically erasable ROM (EEROM). Examples of volatile memory include dynamic random access memory (DRAM) and static random access memory (SRAM). The storage resources may include a hard disk or solid state drive, among others. Similar to the computing functionality of the client device 202, the memory resources and storage resources may dictate a limit on the resolution of content that may be rendered using the client device 202. By way of example, the client device 202 may be required to have a certain size dynamic or static RAM to store received video frames or process the video frames. Absent the availability of memory resources to cache the streamed video, the client device 202 may be configured to drop alternating frames and only display every other received frame, which would defeat the purpose of streaming the video at a higher frame rate.

The client device 202 may also be equipped with one or more input or output devices. The input devices may include a touch screen that responds to a fingertip or a stylus input, a physical keyboard, a digital camera, a microphone, a touchpad or a mouse, among others. The output devices may include visual output devices (such as a screen or a monitor) or audio output devices (such as one or more speakers). The screen may have an associated pixel display resolution and may be capable of displaying images in accordance with its resolution. For example, the screen may have a pixel display resolution of 1024×768 pixels (also known as Extended Graphics Array (XGA)). Furthermore, attributes of the display may include aspect ratio (such as 4:3 or 16:9), display size, refresh rate and color depth. The audio output device may be a dual-channel, six-channel surround sound (also known as 5.1) or eight channel surround sound (also known as 7.1), among others.

The client device 202 may further be equipped with an operating system and may be configured to execute software applications and programs compatible with the operating systems. The ability of the client device 202 to process and render received content may be dependent on the operating system or the applications of the client device 202. For example, streaming protocols may be supported by various operating systems and the capability of the client device 202 to properly process and render content streamed using the streaming may be dependent on whether the operating system of the client device 202 supports the utilized protocol. In addition, applications, such as codecs, may be installed on the client device 202 to enable processing content streamed using a particular protocol.

In various embodiments, the client device 202 may be configured with a video processor or an audio processor, whereby either processor may be a dedicated chip or circuitry operable for usage in decoding streamed content that is encoded using an encoding scheme. The encoding may be in accordance with a standardized encoding technique, whereby the encoding scheme may be a Moving Picture Experts Group (MPEG) Part 10 (commonly known as H.264) for video or Advanced Audio Coding (AAC) for audio, among others. A dedicated video or audio processor may be used in handheld devices, such as smartphones and tablets, where maintaining small form factor necessitates incorporating dedicated circuitry for handling commonly used features. Furthermore, many smart televisions incorporate dedicated video or audio processors so as enable high resolution video or audio output without the need for having an advanced CPU or GPU. The client device 202, particularly if it is a handheld or mobile device, may also include a battery. Attributes associated with the type of battery that the client device 202 has as well as a level of charge of the battery may be used to determine the type of protocol used to provide content to the client device 202.

The service provider 204 may be configured to provide content to the client device 202. As described herein, the content may be any type of media. For example, the content may be video or audio. Furthermore, the content may be graphics, such as computer gaming graphics. In addition, the content may be a remote desktop executed by computing resources of the service provider 204, among others. To cause the content to be provided to the client device, data representing the content may be provided to the client device 202. The content may be encoded as described herein, whereby visual content may be encoded using an video encoding scheme, such as using those specified by MPEG, and audio content may be encoded using an audio encoding scheme, such as AAC. The encoding may be lossy, thereby enabling sacrificing resolution, which may often be unnoticeable or undetectable by human senses, in favor of more compact data representation that enables efficient transmission of the content.

For any one type of encoding or lossy/lossless compression of the content, there are a variety of protocols that may be used to provide the content to the client device 202 over a network. If the delivered content is a desktop environment having a particular quality (for example, a specified frame rate or image compression for video or audio bitrate), there may be a plurality of types of content delivery protocols in accordance with which the desktop environment may be delivered to the client device 202. For example, the types of protocols may include the remote desktop protocol (RDP), (PCoIP), Citrix® HDX and Amazon STX, among others. Each type of delivery streaming protocol may be optimally used for specified client device attributes or network conditions, among others. Further, in some cases given a set of client device attributes or network conditions, one type of content delivery protocol may facilitate delivering higher resolution content using the same network bandwidth resources as another content delivery protocol.

Accordingly, it is advantageous to monitor network conditions and client device 202 attributes and utilize the network conditions and client device 202 attributes to select a content delivery protocol for providing the content to the client device 202. Other factors that may influence the selection of the type of content delivery protocol include streaming server 206 resources. For example, bandwidth resources or computational resources available to the streaming server 206 may be used to select the content delivery protocol. If the bandwidth resources or computational resources available to the streaming server 206 are limited a more efficient or lower resolution content delivery protocol may be used for providing the content to the client device 202.

As shown in FIG. 2, attributes associated with the client device 202 are provided to the service provider 204. The attributes may be provided by the client device 202 and may include hardware or software attributes of the client device as described herein. The attributes may specify the hardware devices with which the client device is configured, such monitor size or resolution or the type of speakers with which the client device 202 is configured, such as dual-channel or surround sound, among others. Further, attributes associated with the memory resources, computational resources or networking resources of the client device 202 may be provided. The device attributes may be provided in a communication packet header sent by the client device 202. For example, when initiating or establishing a streaming session with the streaming server 206, the client device 202 may be configured to provide the service provider 204 with the device attributes such that the protocol selection agent 208 may select a content delivery protocol that is optimum given the device attributes as well as other factors, such as network conditions.

The network conditions may include measures of network bandwidth or latency as well as the type of network used to connect the client device 202 with the streaming server, which may be WLAN, LAN, cellular or a wide-area network (WAN), among others. The network bandwidth may be a measure of the rate at which data may be exchanged between the client device 202 and the streaming server 206, which may be measured in bits or bytes per unit time. The latency may be a measure of the response time observed between two parties over the network as measure in milliseconds (ms), among others. Further, the network conditions, may include a quality-of-service (QoS) associated with the network, whereby measures of the QoS may include a bit error rate (BER) or a packet error rate (PER) of communicated data.

Usage conditions may also be provided to the service provider 204. The usage conditions may indicate one or more actions a user takes on the client device 202 or another device. The usage conditions may, for example, indicate that the user navigated away from an application used to render the streamed content by, for example, minimizing the application. In various embodiments, the usage conditions may indicate that the content is not being viewed based at least in part on detecting actions by a user, such as muting an audio output. The usage conditions may be used to select a protocol that efficiently provides content to the client. For example, if a user navigated away from streamed content, a content delivery protocol that only maintains a minimum level of content delivery may be selected. Navigating away from the streamed content may include switching applications on the client device 202 (for example, from an application used to render the content to another application). Navigating away from an application may be indicative that content is no longer being rendered on the client device 202 or that a resolution of the rendered content has changed.

Following selection of the content delivery protocol, the streaming server 206 may be configured provide the content to the client device 202 in accordance with the content delivery protocol. As described herein, the content delivery protocol may be different than the underlying Transmission Control Protocol/Internet Protocol ("TCP/IP") or UDP, among others, that are used to transport Internet packet data. Further, the content delivery protocol may be different than various audio, image, or video encoding or compression techniques described herein. The content delivery protocol may be a protocol that is configured to deliver a content session using an underlying UDP or TCP/IP infrastructure and appropriate compression or encoding of multimedia data. The content session may be remote desktop session, audio or video streaming session, application or gaming session or document collaboration session, among many others.

Figure 3:
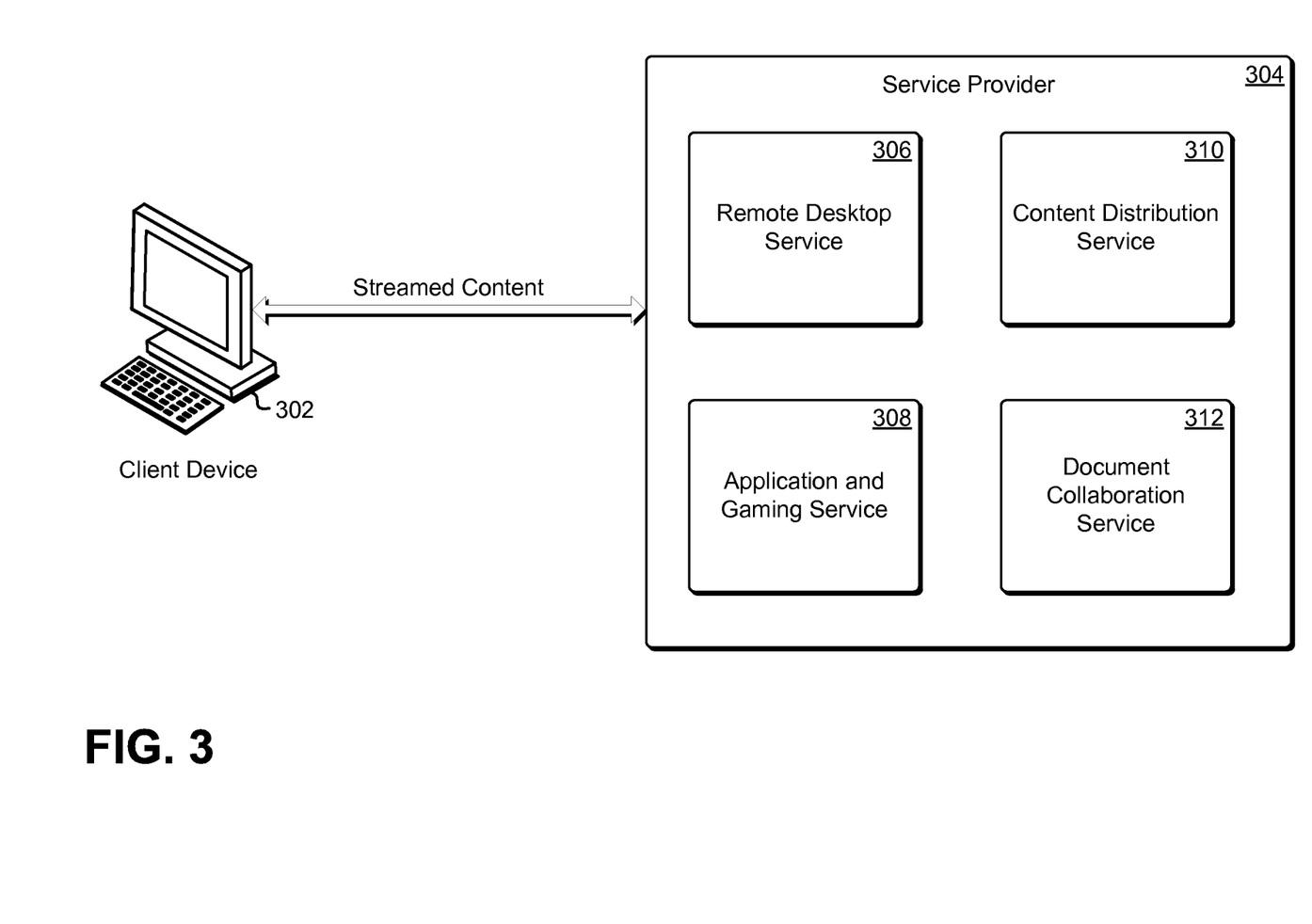
FIG. 3 shows an example of a client device communicating with a service provider in accordance with at least one embodiment.

FIG. 3 shows an example of a client device 302 communicating with a service provider 304 in accordance with at least one embodiment. The service provider 304 may be configured to provide services to the client device 302, which is similar to the client device 202 described with reference to FIG. 2, or an associated user. Providing the services may include providing content to the client device 302. The service provider 304 includes a remote desktop service 306, an application and gaming service 308, a content distribution service 310 and a document collaboration service 312. It is noted that the services 306-312 are exemplary and in various embodiments, the service provider 304 may fewer, alternative or additional services. Each service 306-312 may include a one or more computing resources in a distributed system that are configured to stream content in accordance with a content delivery protocol to the client device 302. For example, service 306-312 each service may include the streaming server 206 and protocol selection agent 208 described with reference to FIG. 2.

The remote desktop service 306 may be configured to provide remote desktops to organizations or their employees. Organizations, such as businesses or corporations, may utilize the remote desktop 306 service to enable their employees to access a desktop computer environment that is executed using remote computing resources of the service provider 204. A remote desktop may be provided to employee devices as content that is streamed using a variety of content delivery protocols, such as remote desktop protocol (RDP), RemoteFX, PCoIP, Citrix® HDX and Amazon STX, among others.

Similarly, the application and gaming service 308 may be configured to provide stream gaming or other application media to the client device 302. A content delivery protocol, such as Microsoft® RemoteFX™ may be used to deliver 3D graphics content to the client device. Such protocol may be advantageous in that it utilizes remote (for example, application and gaming service 308 based graphics processing functionality) for enhancing gaming or application graphics.

The content distribution service 310 may be configured to stream audio or video content to the client device 302, whereby the audio or video content may include movies, television series or music, among others. Various content delivery protocols may be used to deliver the content by the content distribution service 310 to the client device 302 including MPEG Dynamic Adaptive Streaming over Hypertext Transfer Protocol (MPEG-DASH), Apple HTTP Live Streaming (HLS) or Microsoft® Smooth Streaming, among others. In addition, the document collaboration service 312 may enable users to collaborate on documents (for example, in real time) and edit, comment on or modify the documents. Content showing user collaboration may be streamed to the client device 302 using an content delivery protocol, such as WebEx™ over a Hypertext Transfer Protocol Secure (HTTPS) secure communications protocol, among others.

Figure 4:
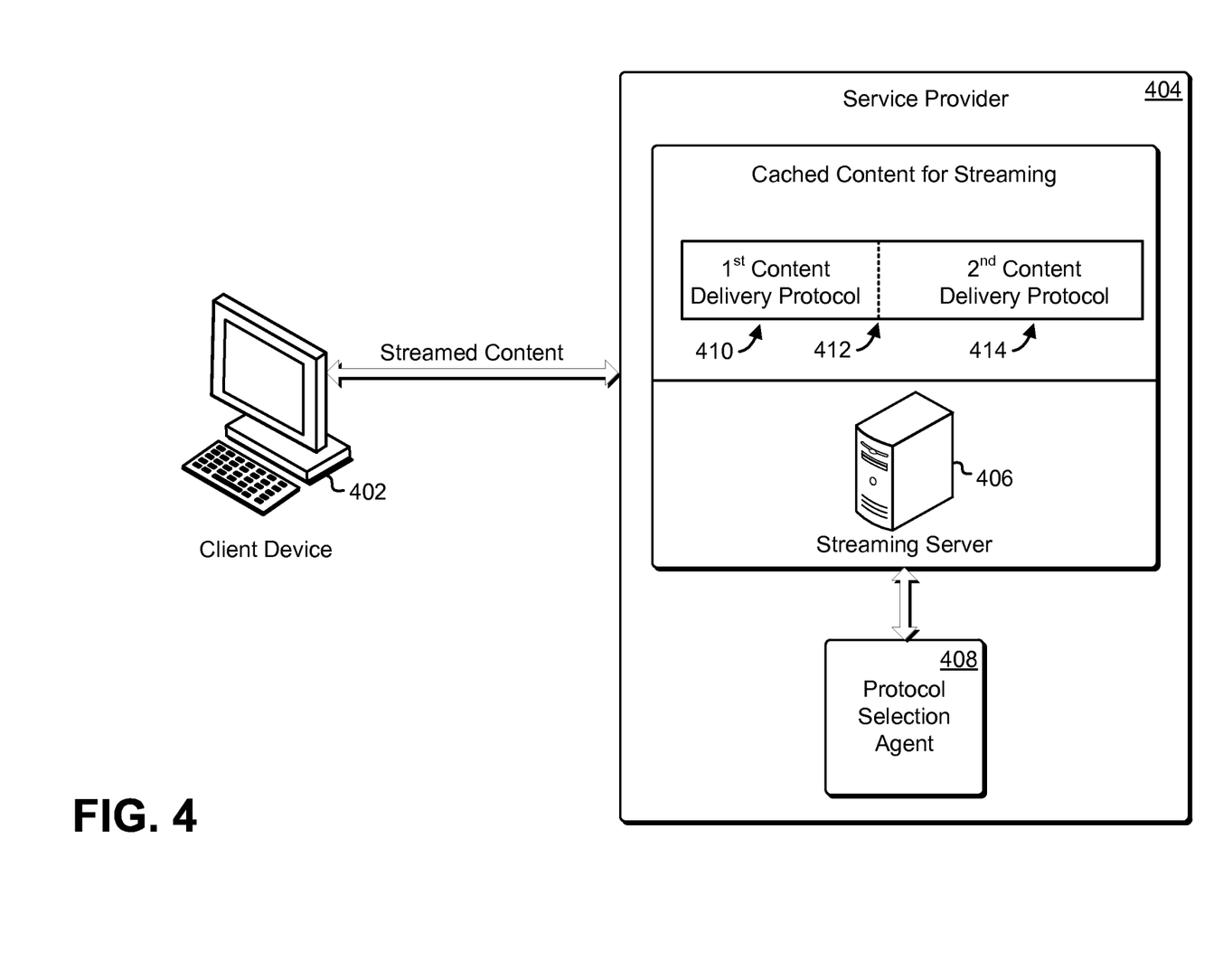
FIG. 4 shows an example of content streaming by a streaming server in accordance with at least one embodiment.

FIG. 4 shows an example of content streaming by a streaming server in accordance with at least one embodiment. A client device 402 that receives streamed content from a streaming server 406 of a service provider 404 is shown in FIG. 4. Further, the service provider 404 includes a protocol selection agent 408. The client device 402, service provider 404, streaming server 406 and protocol selection agent 408 are similar to those described with reference to FIG. 2 and FIG. 3. Although the protocol selection agent 408 is shown as being separate from the streaming server 406, the protocol selection agent 408 maybe part of the streaming server 406.

The streaming server 406 includes memory for storing content to be streamed, whereby the memory may be a cache, among others. The cached content that will be streamed to the client device 402. The cached content may be produced in accordance with a selected content delivery protocol, whereby producing content in accordance with the selected content delivery protocol may include manipulating or converting the content to a schema of the content delivery protocol. Producing the content may include packetizing the content as dictated or specified by the protocol as well performing any action that results in producing data that is compliant with or in accordance with the content delivery protocol.

Content streaming may be performed over a duration of a streaming session. For example, the streaming session may begin when a user logs on to their remote desktop environment and may end when the user logs out of the remote desktop environment. At point during the streaming session, the protocol selection agent 408 may determine (for example, based at least in part on received device attributes, network conditions or usage conditions, among others) that the content streaming protocol should be switched. As shown in FIG. 4, the streaming server caches content for streaming that is in accordance with a first content streaming protocol 410.

The streaming server 406 may receive an indication from the protocol selection agent 408 switch to a second content streaming protocol 414. Accordingly, at a point in the caches stream (referenced by the numeral '412' in FIG. 4) the streaming server 406 begins converting content for streaming to become in accordance with the second content streaming protocol 414. Caching content prior to streaming may vary in duration depending on the application. For example, the cached content may only be milliseconds in length in real-time applications, such as an interactive remote desktop environment or document collaboration environment. However, its length may be seconds, minutes or longer in a non-interactive entertainment application, such as movie streaming. The client device 402 may also cache received content. Caching received content may be advantageous in that it incorporates a time lag that masks to the user processing time required to render the content on an audio-visual output device. Accordingly, the first portion of the content and the second portion of the content even when provided using two different content delivery protocols may be rendered continuously and without a need to pause playback of the content.

Figure 5:
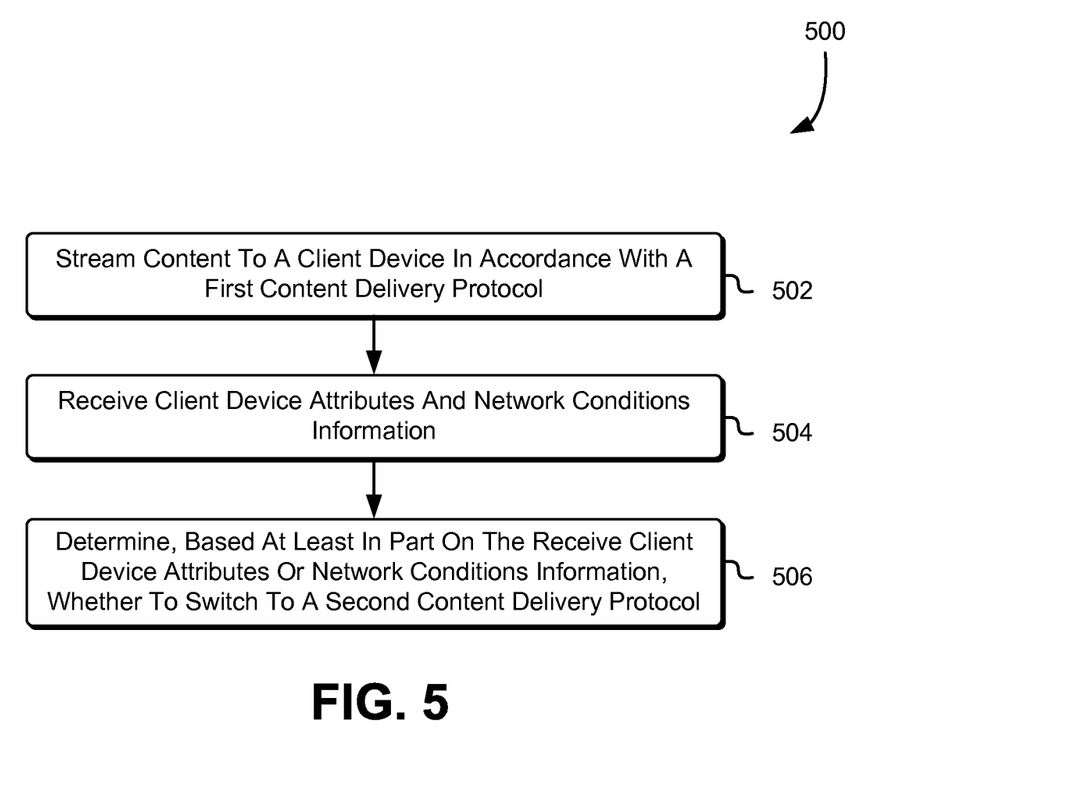
FIG. 5 shows an example of a method for switching between content delivery protocols in accordance with at least one embodiment.

FIG. 5 shows an example of a method for switching between content delivery protocols in accordance with at least one embodiment. In the process 500, a streaming server, such as the streaming server described with reference to numeral '206' in FIG. 2, streams 502 content to a client device in accordance with a first content delivery protocol. A protocol selection entity, such as the protocol selection agent described with reference to numeral '208' in FIG. 2, then receives 504 client device attributes and network conditions information. Further, the protocol selection entity may receive streaming server attributes including measure of computational resource usage of the streaming server or available bandwidth, among others.

The protocol selection entity determines 506 based at least in part on the received client device attributes or network conditions information whether to switch to a second content delivery protocol for providing content to the client device. As described herein, determining whether to switch to the second content delivery protocol may include calculating a fitness measure for a plurality of available protocols given the received client attributes or network conditions information, among others. Further, the determining may include selecting an optimum protocol based at least in part on the calculated fitness measures. The fitness measure may be weighed using observed or known performance factors. For example, if a first protocol is known to be an attractive choice for a range of screen sizes of the client device, the measure score for the first protocol may be weighed to favor the first protocol for those screen sizes. Furthermore, if a second protocol is not compliant with certain operating system devices, the fitness measure may constructed in a manner that takes the second protocol out of contention.

Furthermore, a decision tree may be used to select the content delivery protocol used to deliver content to the client device. For example, a set of content delivery protocols may be identified as candidates for use when the client minimizes or navigates away from an application used to render the streamed content. A content delivery protocol of the set of content delivery protocols may then be used for content streaming if received usage conditions indicate that the conditions for which the protocol is optimum are satisfied. The decision tree may be traversed based at least in part on the received indicia (for example, device attributes, network conditions or usage conditions) until a protocol or a set of protocols are reached. The protocol or a protocol from the set of protocols may be selected for use in delivering the content.

A first set of content delivery protocols may be identified as candidates for use to stream content to client devices having a particular screen size. A second set of content delivery protocols, on the other hand, may be identified as candidates for use when a range of network conditions are detected, such as 5-20 ms packet response time. If the network conditions have changed such that the packet response time fells within the range and the user device had a screen size for which the first set of content delivery protocols are fit, then a protocol that is a member of both sets may be selected. Conversely, if the two sets are determined not to overlap and a protocol is not found, a less optimum protocol from either set may be selected. Further, different content delivery protocols may be categorized for use with specific streaming applications, such as a remote desktop application or gaming application.

Figure 6:
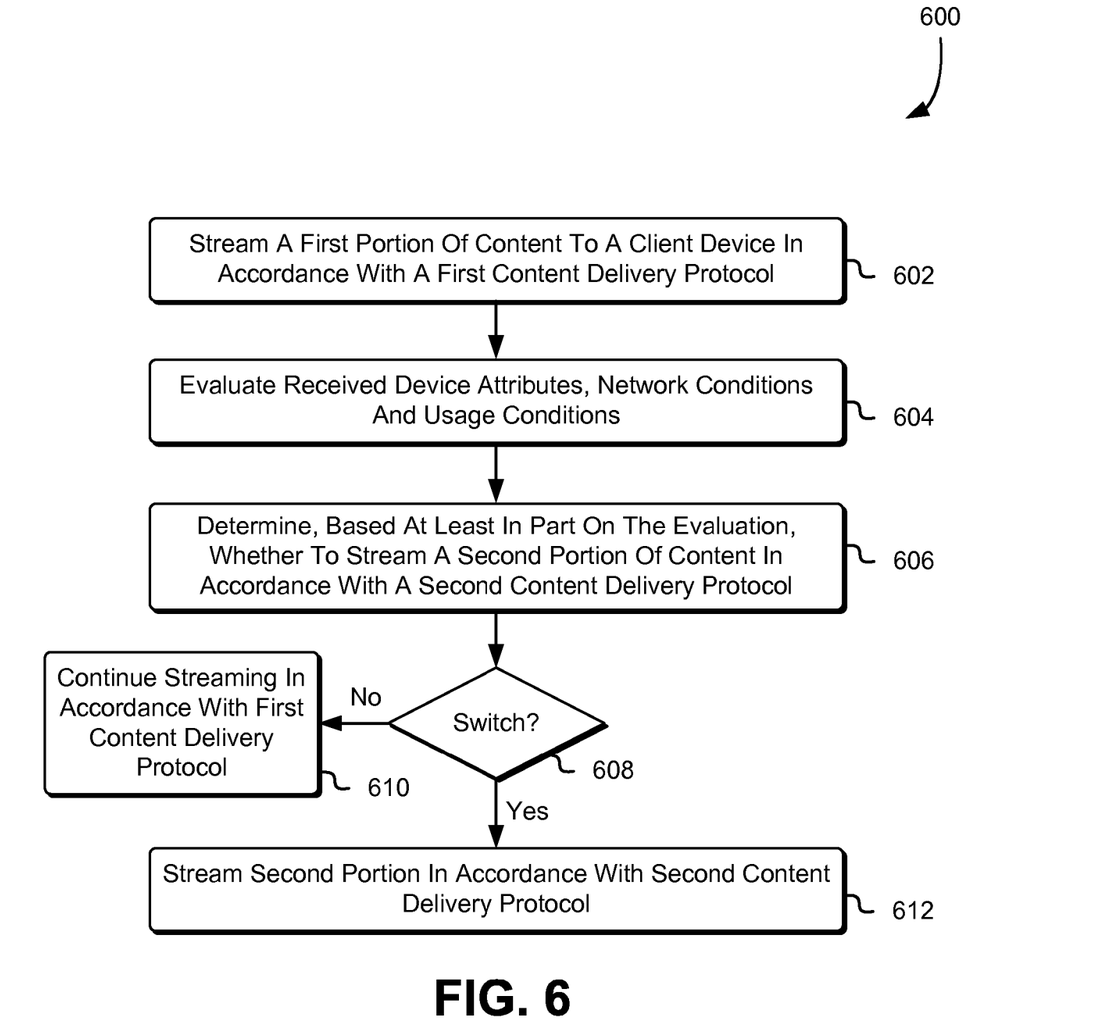
FIG. 6 shows an example of a method for content delivery protocol selection in accordance with at least one embodiment.

FIG. 6 shows an example of a method for content delivery protocol selection in accordance with at least one embodiment. In the process 600, a streaming server, such as the streaming server described with reference to numeral '206' in FIG. 2, streams 602 a first portion of content to a client device in accordance with a first content delivery protocol. A protocol selection entity, such as the protocol selection agent described with reference to numeral '208' in FIG. 2, then evaluates 604 received device attributes, network conditions and usage conditions and determines 606 based at least in part on the evaluation whether to stream a second portion of the content to the client device in accordance with a second content delivery protocol.

If a negative determination 608 is made, the streaming server continues 610 streaming to the client device in accordance with first content delivery protocol and the content delivery protocol used to provide content to the client device is not changed. If, on the other hand, a positive determination 608 is made, the streaming server switches between content delivery protocols and streams 612 the second portion of the content in accordance with the second content delivery protocol.

Figure 7:
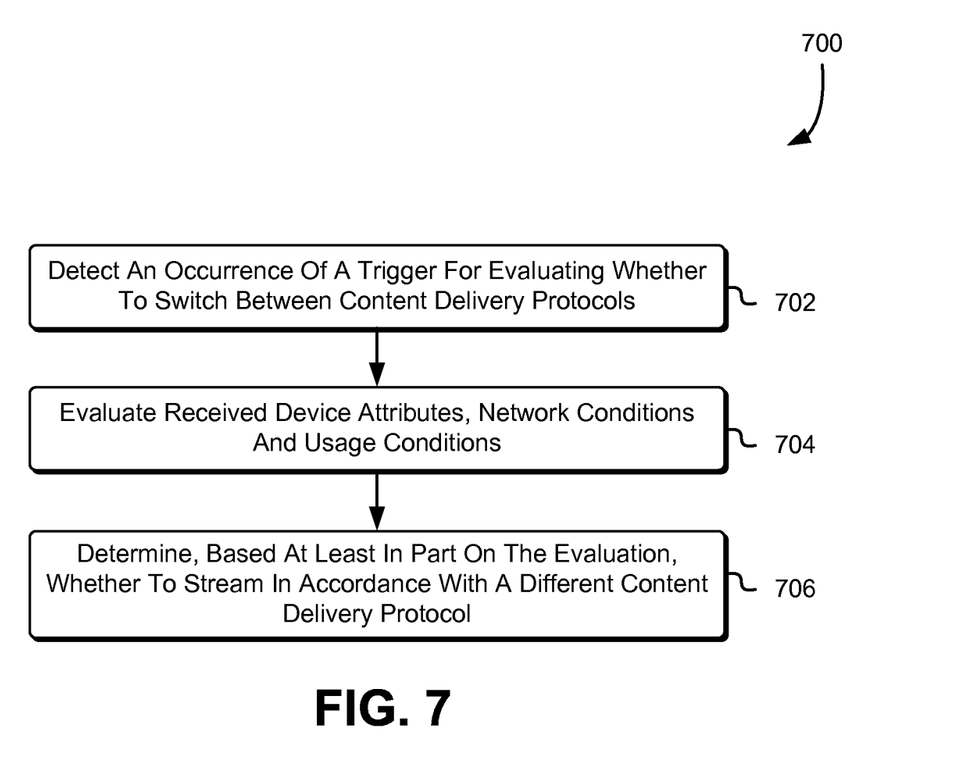
FIG. 7 shows an example of a method for determining whether to switch between content delivery protocols in accordance with at least one embodiment.

FIG. 7 shows an example of a method for determining whether to switch between content delivery protocols in accordance with at least one embodiment. In the process 700, a protocol selection entity, such as the protocol selection agent described with reference to numeral '208' in FIG. 2, detects 702 an occurrence of a trigger for evaluating whether to switch between content delivery protocols. The trigger may be an indication that a user has switched between devices used to receive a streaming session. For example, a streaming session may have been initiated on a first device of the user and the user may have resumed the streaming session on a different device having a different device type or being associated with different device attributes, network conditions or usage conditions. In various embodiments, the trigger may be configured to occur periodically or based at least in part on a time schedule.

Furthermore, the trigger may occur whenever the device attributes, network conditions or usage conditions change.

The protocol selection entity evaluates 704 received device attributes, network conditions and usage conditions as described herein. The device attributes, network conditions or usage conditions may be associated with a device that is different from another device on which a streaming session may have been initiated. The protocol selection entity then determines 706 based at least in part on the evaluation whether to stream content in accordance with a different content delivery protocol.

While many of the disclosed embodiments are described in the context of a system where the client device is remotely situated from other computing resources, at least some embodiments can also be used in situations where the client device interacts with computing resources located in an on-premises installation. For example, the client device could use a VDI located within the same building or campus as the client device.

Figure 8:
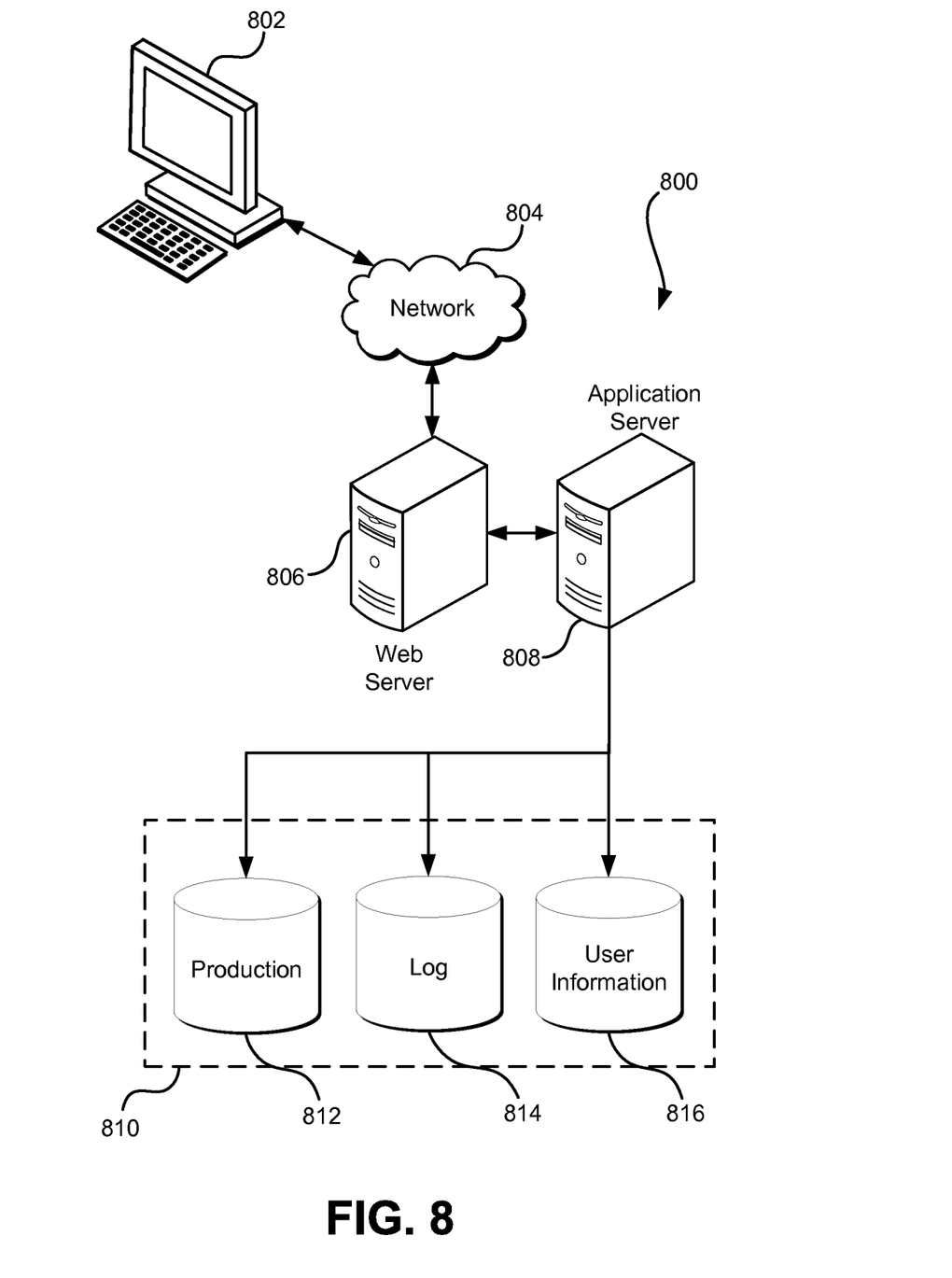
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving information indicative of client device attributes and network conditions, the information being usable for selecting a content delivery protocol for streaming content associated with a remotely executed computer system desktop environment to a client device, and the network conditions specifying one or more measures of network connectivity performance;
   selecting, based at least in part on the information, a first content delivery protocol;
   establishing, in accordance with the first content delivery protocol, a streaming session for delivery of the content to the client device;
   streaming, over the streaming session, a first portion of the content to the client device using the first content delivery protocol, the content including encoded audio-visual media;
   receiving a usage condition associated with the remotely executed computer system desktop environment, the usage conditions indicating one or more actions taken on the client device, the one or more actions causing changes to the client device attributes;

evaluating the usage condition to determine that a second portion of the content is to be delivered using a second content delivery protocol from a plurality of content delivery protocols;

modifying the streaming session in accordance with the second content delivery protocol; and streaming, over the streaming session, the second portion of the content using the second content delivery protocol.

2. The computer-implemented method of claim 1, wherein the remotely executed computer system desktop environment is a remote desktop session of a virtual desktop infrastructure.

3. The computer-implemented method of claim 1, wherein:

the first portion of the content and the second portion of the content are streamed by a streaming server;

wherein the computer-implemented method further comprises receiving further information indicative of conditions of the streaming server; and the conditions of the streaming server specify network bandwidth available to the streaming server or computational resource usage of the streaming server.

4. A system, comprising:

one or more processors; and memory including instructions that, as a result of being executed by the one or more processors, cause the system to:

send, to a client device, a first portion of content encoding a media remote desktop session over a streaming session in accordance with a first content delivery protocol;

receive information indicating a usage condition of the client device, the usage condition indicating one or more client device user interface operations corresponding to the first portion of the content that cause changes to the remote desktop session of the client device;

evaluate the information to determine that a second portion of the content is to be delivered to the client device in accordance with a second content delivery protocol, the second content delivery protocol being different than the first content delivery protocol;

modify the streaming session in accordance with the second content delivery protocol; and send the second portion of the content over the streaming session in accordance with the second content delivery protocol.

5. The system of claim 4, wherein a resolution of the first portion of the content is the same as a resolution of the second portion of content.

6. The system of claim 4, wherein the one or more client device user interface operations include at least one of: navigating away from an application used to render the remote desktop session of the client device, resuming the streaming session on a second device that is different from the client device, and minimizing the application used to render the remote desktop session of the client device.

7. The system of claim 4, wherein the usage condition further including information indicating at least one of a screen size or screen resolution of the client device.

8. The system of claim 4, wherein the information further includes network conditions indicating latency or bandwidth associated with a network used to deliver the first portion of the content.

9. The system of claim 4, wherein the first content delivery protocol and the second content delivery protocol are categorized as being usable to provide content to a device comprising at least one attribute of the client device attributes.

10. The system of claim 4, wherein the first portion of the content and the second portion of the content are rendered on the client device continuously and without pausing playback.

11. A non-transitory computer-readable storage medium comprising executable instructions that, as a result of being executed by one or more processors of a computer system, cause the computer system to at least:

stream, to a client device over a streaming session in accordance with a first content delivery protocol, a first portion of content;

receive information indicating one or more operations associated with a user interface of the client device that cause changes to an application displaying the first portion of the content;

select, based at least in part on the information, a second content delivery protocol from a plurality of content delivery protocols, the second content delivery protocol being different from the first content delivery protocol;

modify the streaming session in accordance with the second content delivery protocol; and stream, over the streaming session, a second portion of the content in accordance with the second content delivery protocol, the first content delivery protocol and second content delivery protocol are delivered over an underlying internet protocol, the underlying internet protocol including Transmission Control Protocol (TCP) or User Datagram Protocol (UDP).

12. The non-transitory computer-readable storage medium of claim 11, wherein the instructions that cause the computer system to stream the second portion of the content in accordance with the second content delivery protocol further include instructions that cause the computer system to stream the second portion of the content to another client device that is different from the client device.

13. The non-transitory computer-readable storage medium of claim 12, wherein client device attributes of the client device include one or more attributes of the second other device.

14. The non-transitory computer-readable storage medium of claim 11, wherein the instructions that cause the computer system to stream the second portion of the content in accordance with the second content delivery protocol further include instructions that cause the computer system to stream the second portion of the content to the client device.

15. The non-transitory computer-readable storage medium of claim 11, wherein the first content delivery protocol is selected based at least in part on a first set of client device attributes associated with the client device.

16. The non-transitory computer-readable storage medium of claim 11, wherein:

the instructions that cause the computer system to stream the second portion of the content further include instructions that cause the computer system to stream the second portion of the content using a streaming server; and the information further indicates one or more conditions associated with the streaming server.

17. The non-transitory computer-readable storage medium of claim 16, wherein the one or more conditions of the streaming server are at least one of network bandwidth available to the streaming server or computational resource usage of the streaming server.

18. The non-transitory computer-readable storage medium of claim 11, wherein the first portion of the content and the second portion of the content are part of the streaming session for a remote desktop application.

19. The system of claim 4, wherein the one or more client device user interface operations corresponding to the first portion of the content includes disabling at least one client device function associated with presenting the first portion of the content.

20. The non-transitory computer-readable storage medium of claim 11, wherein the instructions that cause the computer system to select the second content delivery protocol further include instructions that cause the computer system to select the second content delivery protocol based at least in part on a fitness measure associated with the second content delivery protocol, the fitness measure determined based at least in part on assigning weights to a set of factors included in the information.

* * * * *